March 10, 1936.                F. FISCHER                    2,033,193
            METHOD AND DEVICE FOR REPRODUCING SOUND RECORDS
                      OBTAINED ON LENTICULATED FILMS
                         Filed Aug. 2, 1932
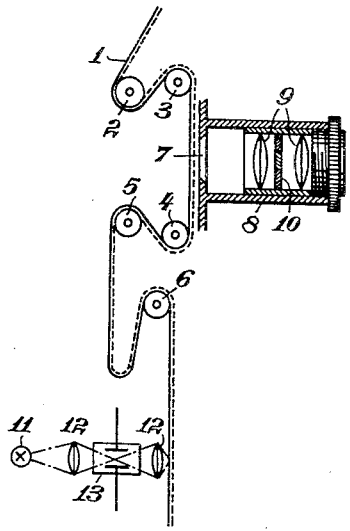
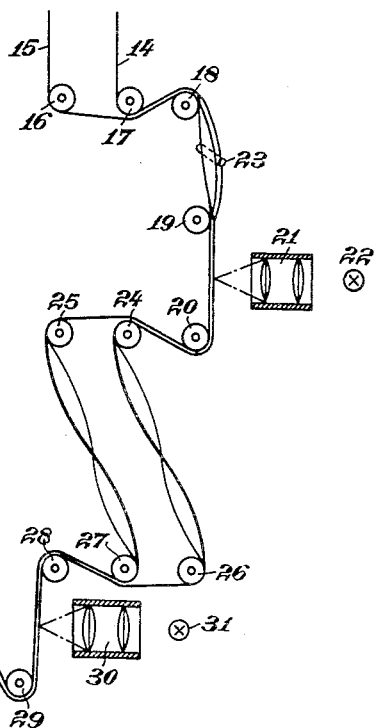
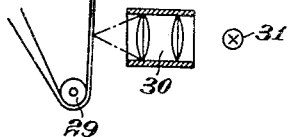
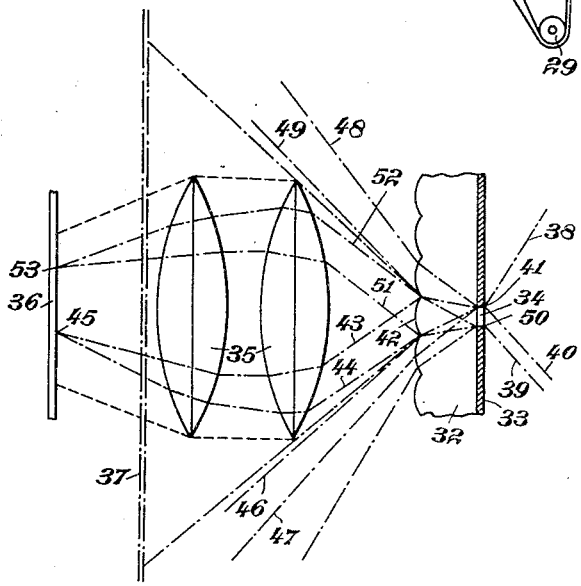
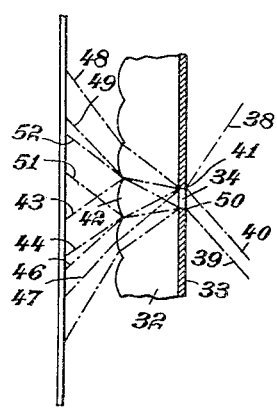
INVENTOR
Fritz Fischer
By ATTORNEYS Patented Mar. 10, 1936

2,033,193

UNITED STATES PATENT OFFICE 2,033,193

METHOD AND DEVICE FOR REPRODUCING SOUND RECORDS OBTAINED ON LENTICULATED FILMS

Fritz Fischer, Berlin-Charlottenburg, Germany, assignor to Siemens & Halske, Aktiengesellschaft, Siemensstadt, near Berlin, Germany, a corporation of Germany Application August 2, 1932, Serial No. 627,253
In Germany August 3, 1931

2 Claims. (Cl. 88—16.2)

This invention relates to a method of and device for reproducing sound records obtained on lenticulated films.

The advantage of the invention consists in that the sound can be recorded on the goffered film, without necessitating a special smooth longitudinal slip for the sound track, as has been suggested previously. It is also possible to use lenticulated films on which the lenticular elements are formed by special lenses or cylindrical ones running transversally or inclined with respect to the longitudinal direction of the film. Use may also be made of cylindrical lenticulations running in parallel with the longitudinal direction. When applying the new method and those new devices, which serve for carrying said method into effect, interfering frequencies called forth by the lenticulation are not perceived in the reproduction process.

This invention consists in that the sound track of films is illuminated from the smooth side. In much the same manner as the reproduction the manufacture of such films is preferably such that the illumination is effected from the smooth side. When recording sound, the light need not then penetrate into the lenticulation which would involve an impairing of the form or blackening of the sound track. Nor can such a disturbance occur if the film, on which a sound record is obtained by means of a copying process, is illuminated from the smooth side. In the reproduction process, a disturbance through the lenticulation is eliminated by the fact that the aperture of the photoelectric cell or of the optical system placed in front of that cell is made sufficiently large and that these devices are placed sufficiently near to the film.

The invention permits of avoiding the drawbacks of other methods, which consist for instance in the occurrence of an interfering frequency due to the lenticulation, which is the more pronounced, if the light gap becomes narrower than a lenticular element. If the film is embossed with cylindrical lenses which run entirely or almost in parallel with the longitudinal direction of the film, the lenses interfere only slightly with the reproduction of sound. Their influence increases, however, if the cylindrical lenses run transversely or diagonally with respect to the longitudinal direction of the film or if the film is embossed with spherical, hexagonal lenticular elements or the like. Nevertheless it is sometimes necessary to use transversally or diagonally embossed films on account of the difficulties involved in the copying process.

When sound is recorded on the film, the interfering effect of the lenticulation is avoided, if the film is illuminated from the emulsion side and not from the embossed side as would apparently be in accordance with picture recording. Such a manner of recording sound does not encounter any difficulties, since the method requires only a few modifications, as compared with the method of using smooth films.

The action of the lenticular elements in the reproduction of a sound record made according to the invention can then be entirely avoided by a suitable dimensioning of the effective aperture of the photoelectric cell. The angle at which this aperture is seen from the film must be at least equal to the angle at which the width of a lenticular element is seen from the emulsion layer. When a film is used which is embossed with cylindrical elements, only those angles must be equal which are lying in a plane transverse to the direction of the lenticular elements, while in the parallel plane the aperture of the photoelectric cell is without any influence in sound reproduction.

The application of the method will be explained more fully by means of the figures.

Fig. 1 represents a taking device, Fig. 2 an attachment for copying films and Figs. 3 and 4 the light beam in the reproduction process on a considerably enlarged scale.

In Fig. 1, the film 1 runs over the rollers 2 to 6. The embossed side of the film is indicated by a dotted line. The film slip is at first made to pass by the threading gap 7 of the taking objective 8, which consists of the lenses 9 and the selective colour filter 10. At a point where the film runs at a constant speed, provision is made for the sound record device. It is represented by the tone lamp 11, the lenses 12 and the Kerr cell 13. This sound record device is placed so as to enable the film to be illuminated from the emulsion side. It may also be placed on the other side, if in the path of the film between threading gap and sound record device, provision is made for an arrangement for turning the film.

In the copying process of the sound record, the emulsion sides of the films must be placed one upon the other, whereas the copying of the picture requires the embossed sides to be placed upon one another. An arrangement serving for copying purposes is shown in Fig. 2. From the storage wheels the exposed film 14 and the unexposed film 15 are led over rollers 16 to 20, past the copying lamp for the picture record. For illuminating the film, use is made of the optical system 21 and the light-source 22. At this point, the films are placed one upon the other with their embossed sides and, in order to eliminate the watered effects occurring in the copying of lenticulated films, provision is made for an oblique running of the films. In the constructional example, this is achieved by a small rod 23 which is placed slantwise between the films, as more fully described and claimed in U. S. patent to Arni, 1,876,442.

From the roller 20, the films run over rollers 24 to 27 so as to enable them to be turned respectively between the rollers 24 and 26 and 25 and 27. Between the rollers 28 and 29 they run in such a manner that their emulsion sides are placed upon one another. At this point the sound record is copied with the aid of the optical system 30 and the light-source 31. From the rollers 28, the films go on to the film drums.

In order to enable such parts of the sound record as lie behind the border of a lenticular element to be illuminated in this copying process just as much as are the parts situated behind the center of a lens, the angle at which the light rays strike the exposed film should be equal in magnitude to the relative aperture of the lenses facing the light-source. The relative aperture is the angle at which the width of a lenticular element is seen from the emulsion layer, and the angle filled by all beams of light passing through one point of the emulsion is sometimes called aperture angle. In this way, the aperture angle of the light cone striking the elements of the sound record on the exposed film can be made everywhere equal to that of the relative aperture of the lenses, irrespective of whether the point under consideration lies exactly behind the center of a lens or nearer to the border.

The effect of the lenticulation can be eliminated in the reproduction process by a suitable dimensioning of the size of the photoelectric cell, as is shown in Fig. 3 with the help of a constructional example. The embossed record medium 32, which may for instance be of celluloid, is supplied with the emulsion 33 carrying the sound record. For reasons of simplicity the illuminated point 34 of the sound record has not been hatched.

For the picking up of the light passing through the film, provision is made of the optical system including the lenses 35 and a photoelectric cell, whose sensitive part is shown at 36. The image thereof viewed from the film appears at 37 and the relative aperture, at which this image is seen from the film should be equal to the relative aperture of a lenticular element.

The fact that such a dimensioning does not give rise to an objectionable action of the lenticulation will become evident, if one considers that the amount of light passing through the film and striking the cell is independent of whether the illuminated point is exactly behind the center of a lens or displaced laterally or lies behind an edge existing between two lenses. For this end, the light beam will be examined more closely.

Such a light-brush illuminating the sound record is shown in Figs. 3 and 4 as bounded by the rays 38 and 39. In addition, the ray 40 represents one of the border rays of the light cone which strikes the sound record at the same point 41 as does ray 38. From point 41, the light beam passes through the film. Part of this light penetrates into the lens 42 which is placed immediately before the record and fully illuminated. The light cone coming from point 41 leaves the film as an almost parallel running brush limited by the rays 43 and 44. The direction of this beam is a function of the situation of point 41. If point 41 lies behind the border of a lenticular element, even the outermost ray 44 is picked up by the lenses 35 and projected on to the sensitive surface of cell 36.

If point 41 approaches the center of the area situated behind lens 42, the angle of slope of the beam determined by the rays 43 and 44 decreases, and this beam comes out normal to the film, if point 41 is exactly behind the center of lens 42. Hence the whole of the light emitted from a point of the emulsion through the lens in front of it always strikes the sensitive cell. However, the light beams, 46, 47 and 48, 49, which pass through the surface 34, but not through the lens 42, do not strike the light-reactive emulsion 36.

The same holds good for the other border point 50 of the light gap through which ray 39 passes. The light emitted from this point through lens 42 leaves the film as a parallel light beam limited by rays 51 and 52 and concentrated by lenses 35 at point 53. The light beams emanating from the other points of the illuminated surface 34 are situated between the two parallel light beams 43, 44 and 51, 52.

Herefrom it is at once evident that all the light passing through any point of the emulsion layer and through the lens element lying in front of said point is striking the light sensitive layer 36 of the photocell, if the relative aperture of the cell is in accordance with that of a lenticular element. Since from all the points of the sound record the lens before it is viewed at almost the same angle, the light sent from these points through the lens is approximately independent of the situation of the point in the sound record, if the lens is fully illuminated. To obtain this, it is of advantage to make the angle at which the light-source is viewed from the film, twice as large as that of the relative aperture of the lenticular element. If this relative aperture is say 1/2, 5, the aperture of the angle limited by rays 38 and 40 must be 1/1, 25.

It is remarkable in the performance of the device shown in Fig. 3 that the light spot on the surface 36 moves upwardly if the film runs downwardly and that in that case the spot on the surface 36, when passing from one lens to the next, always moves downwardly, so that the surface 36 is partly illuminated at its upper end and partly at its lower end and dark in the meantime.

Instead of the device shown in Fig. 3, use can also be made of the simpler one shown in Fig. 4. In this constructional example, the light-reactive emulsion 36 of the photoelectric cell has been given such a size and is placed sufficiently near the film that it picks up the whole of the light passing through the illuminated point 34, regardless of whether this light is refracted by the lens 42 or by an adjacent lens. The light beam 48, 49 accordingly strikes the emulsion 36. In such a device, a reliable reproduction of sound can also be obtained independently of the size of the light-source, provided the relative aperture at which the layer 36 viewed from the film be sufficiently large. Between film and light-reactive emulsion, there can in this case be arranged a suitable optical system.

I claim as my invention:

1. The method of copying picture and sound records from one lenticulated film to another which comprises feeding said films past a light source, with the lenticulations on the two films facing each other, and exposing the picture areas of said films to said source of light, reversing the positions of the films so that the emulsion sides thereof face each other, then feeding the films past a second light source and exposing the sound record areas thereon to said last-named light source.

2. The method of copying picture and sound records from one lenticulated film to another which comprises feeding said films past a light source, with the lenticulations on the two films facing each other, and exposing the picture areas of said films to said source of light, reversing the positions of the films so that the emulsion sides thereof face each other, then feeding the films past a second light source and exposing the sound record areas thereon to said last-named light source through a condensing lens having an aperture at least equal to the aperture of the lenticulations on the films.

FRITZ FISCHER.